United States Patent
Sugiyama

(10) Patent No.: US 6,434,646 B1
(45) Date of Patent: Aug. 13, 2002

(54) SIGNAL DISTRIBUTION SYSTEM AND METHOD BASED ON BUS ARRANGEMENT

(75) Inventor: Yukinori Sugiyama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/287,490

(22) Filed: Apr. 6, 1999

(30) Foreign Application Priority Data

Jul. 4, 1998 (JP) .......................................... 10-094960

(51) Int. Cl.$^7$ .............................................. G06F 13/00
(52) U.S. Cl. ...................... 710/100; 710/300; 710/305; 710/316; 326/101
(58) Field of Search ................................ 710/100, 107, 710/126–129, 131, 305, 300, 306, 307, 316; 307/42, 43; 326/101; 327/593, 595

(56) References Cited

U.S. PATENT DOCUMENTS

| | | | |
|---|---|---|---|
| 4,516,076 A | * | 5/1985 | Pillari et al. ................. 324/418 |
| 5,440,698 A | * | 8/1995 | Sindhu et al. ............... 709/225 |

FOREIGN PATENT DOCUMENTS

| | | |
|---|---|---|
| EP | 0778531 A1 * | 6/1997 |
| EP | 0892352 A1 * | 1/1999 |
| JP | 61-160169 | 7/1986 |
| JP | 64-31251 | 2/1989 |
| JP | 64-79850 | 3/1989 |
| JP | 1-177664 | 7/1989 |
| JP | 4-140873 | 5/1992 |
| JP | 5-204837 | 8/1993 |
| JP | 7-84940 | 3/1995 |
| JP | 9-167149 | 6/1997 |
| JP | 9-218734 | 8/1997 |

OTHER PUBLICATIONS

Japanese Office Action issued Mar. 7, 2000 in a related application with English translation of relevant portions.
Japanese Office Action issued Jun. 8, 2000 in a related application with English translation of relevant portions.

* cited by examiner

*Primary Examiner*—Xuan M. Thai
(74) *Attorney, Agent, or Firm*—Dickstein, Shapiro, Morin & Oshinsky LLP.

(57) ABSTRACT

A signal distribution system includes a plurality of functional blocks, at least one bus signal distribution block, at least one bus, and a bus control circuit. The functional blocks are divided into a plurality of groups each of which receives bus signals of the same type. The bus signal distribution block distributes a bus signal received from a transmission source functional block to a transmission destination functional block. The bus is connected between the bus signal distribution block and the functional blocks and has division buses arranged in units of groups of the functional blocks. The bus control circuit controls the bus signal distribution block to select one of the division buses connected to a transmission destination group on the basis of an address signal received from the transmission source functional block and transmit the received bus signal to the transmission destination functional block in the transmission destination group through the selected division bus.

12 Claims, 15 Drawing Sheets

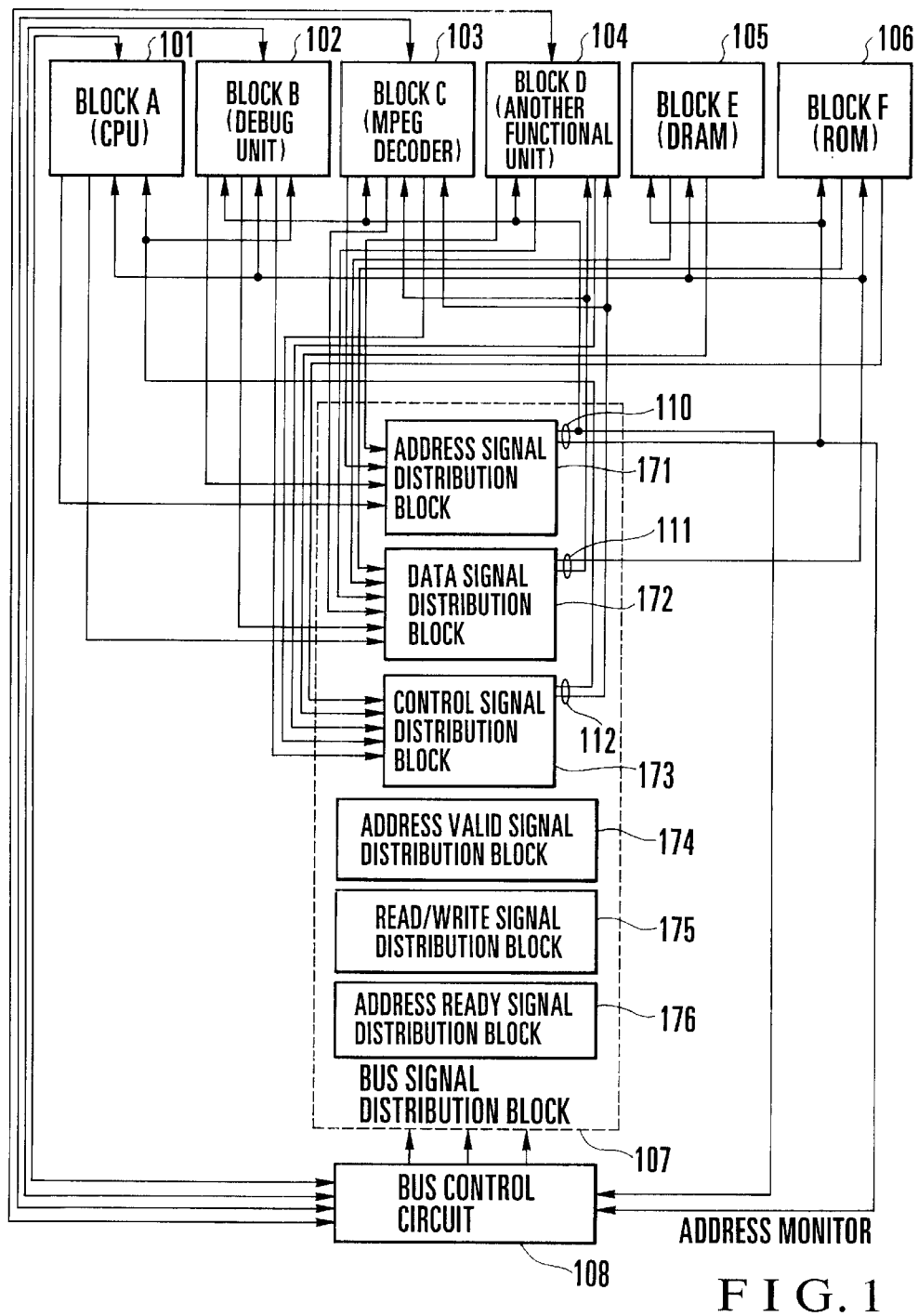
F I G. 1

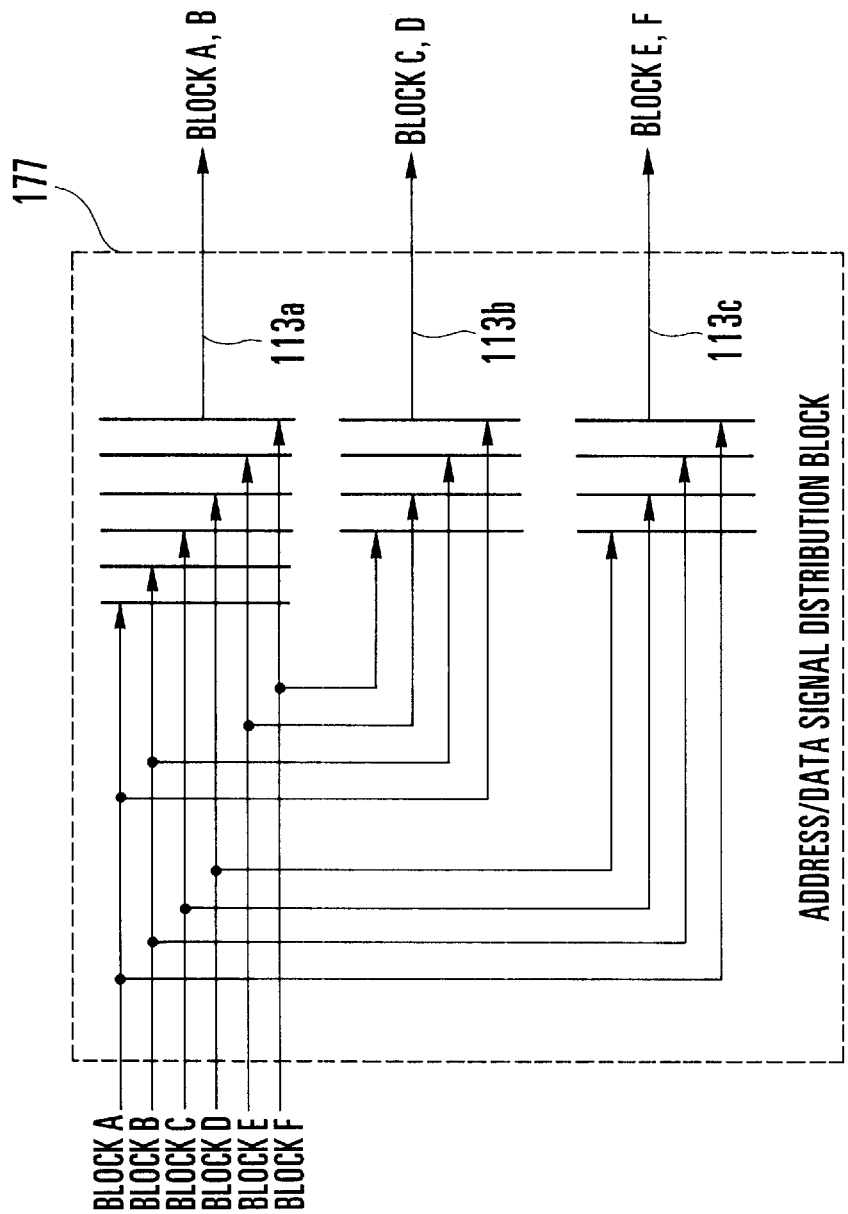

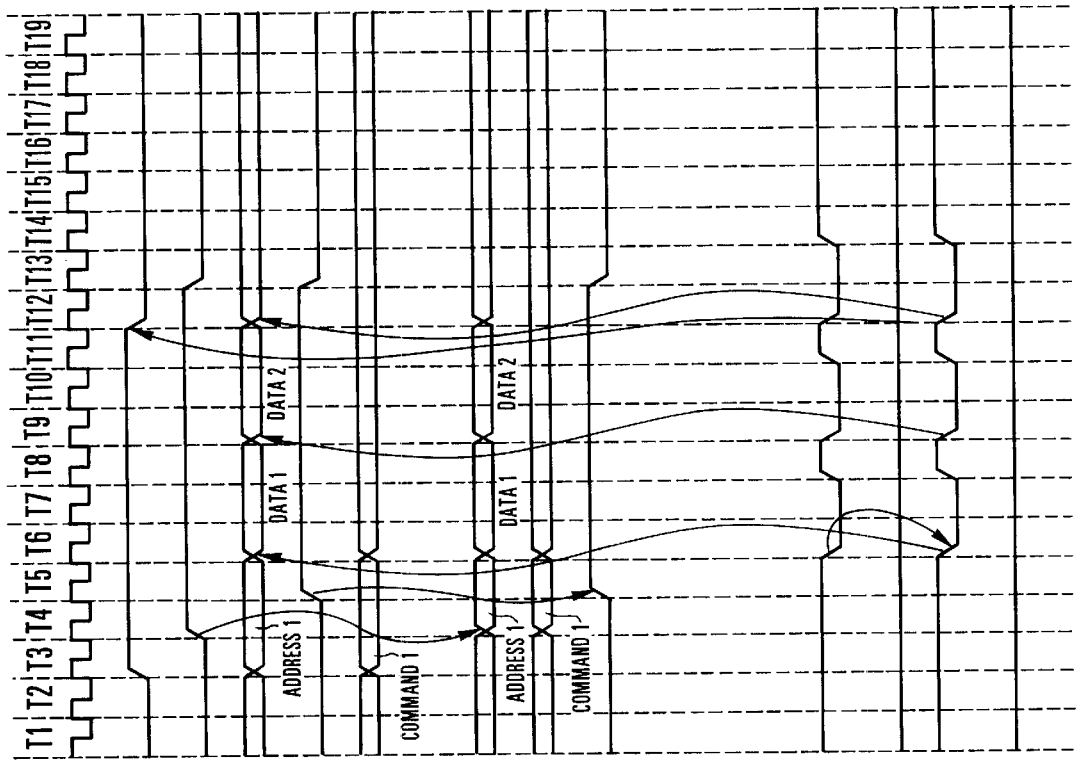
FIG. 10A CLOCK
FIG. 10B BUS USE REQUEST SIGNAL (101→108)
FIG. 10C BUS USE PERMISSION SIGNAL (108→101)
FIG. 10D ADDRESS/DATA SIGNAL (101→177)
FIG. 10E ADDRESS VALID SIGNAL (101→174)
FIG. 10F COMMAND SIGNAL (101→178)
FIG. 10G ADDRESS/DATA SIGNAL (177→104)
FIG. 10H ADDRESS SIGNAL (178→104)
FIG. 10I ADDRESS VALID SIGNAL (174→104)
FIG. 10J ADDRESS READY SIGNAL (101→176)
FIG. 10K DATA READY SIGNAL (104→173)
FIG. 10L ADDRESS READY SIGNAL (176→104)
FIG. 10M DATA READY SIGNAL (173→101)

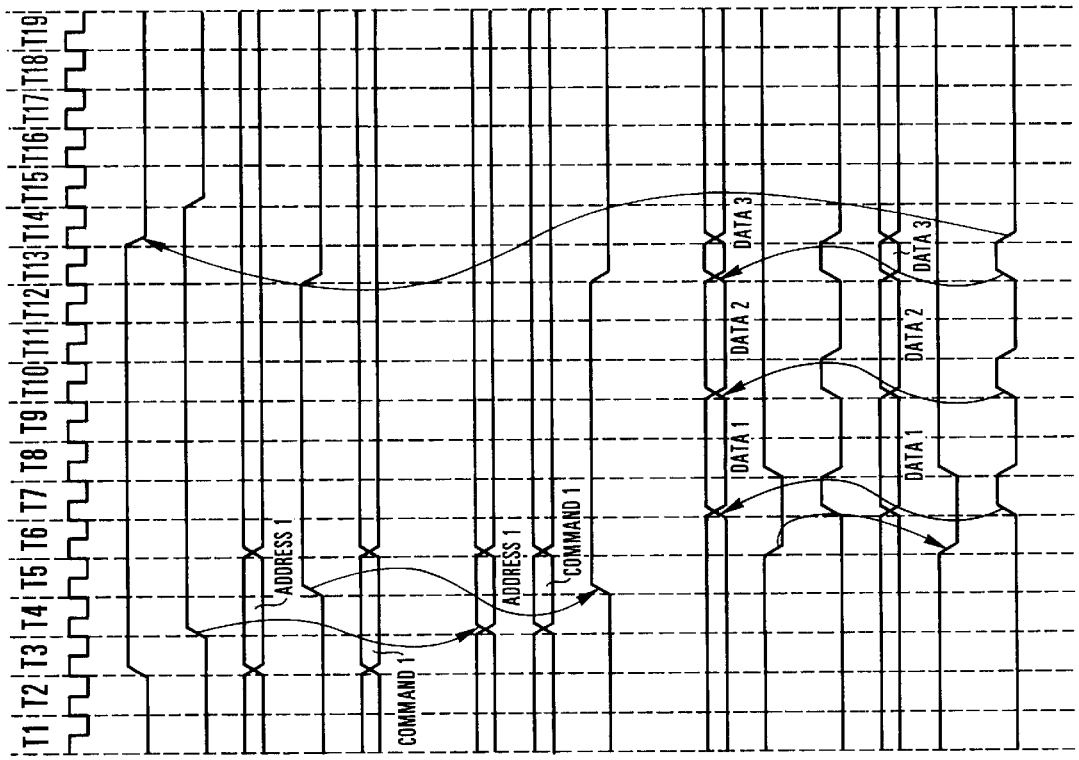

FIG. 11A CLOCK
FIG. 11B BUS USE REQUEST SIGNAL (101→108)
FIG. 11C BUS USE PERMISSION SIGNAL (108→101)
FIG. 11D ADDRESS/DATA SIGNAL (101→177)
FIG. 11E ADDRESS VALID SIGNAL (101→174)
FIG. 11F COMMAND SIGNAL (101→178)
FIG. 11G ADDRESS/DATA SIGNAL (177→104)
FIG. 11H COMMAND SIGNAL (178→104)
FIG. 11I ADDRESS VALID SIGNAL (174→104)
FIG. 11J ADDRESS/DATA SIGNAL (104→177)
FIG. 11K ADDRESS READY SIGNAL (101→176)
FIG. 11L DATA READY SIGNAL (104→173)
FIG. 11M ADDRESS/DATA SIGNAL (177→101)
FIG. 11N ADDRESS LEADY SIGNAL (176→104)
FIG. 11O DATA READY SIGNAL (173→101)

SIGNAL DISTRIBUTION SYSTEM AND METHOD BASED ON BUS ARRANGEMENT

BACKGROUND OF THE INVENTION

The present invention relates to a signal distribution system and method based on a bus arrangement and, more particularly, to a signal distribution system and method based on a bus arrangement comprising an address bus, a data bus, a control bus, and the like.

Conventionally, there are devices called system LSIs (Large Scale Integrated Circuits) in which not only a CPU but also interfaces of memory devices such as a DRAM (Dynamic Random Access Memory) and a ROM (Read Only Memory) and functional units such as an MPEG (Moving Picture image coding Experts Group) decoder are integrated on one chip. In such a system LSI, the functional blocks including a CPU are connected through an address bus, a data bus, a control bus, and the like. The buses are driven and controlled by a bus control circuit formed on the same chip.

FIG. 12 shows a bus arrangement in a conventional system LSI.

As shown in FIG. 12, a plurality of functional blocks A to F are arranged on a chip in accordance with their functions. In this case, the block A is a CPU 1, the block B is a debug unit 2, the block C is an MPEG decoder 3, the block D is another functional unit 4 such as a graphic engine, the block E is a DRAM interface 5, and the block F is a ROM interface 6. In addition to the functional blocks A to F, a bus signal distribution block 7 and a bus control circuit 8 are integrated on the same chip.

With this arrangement, various bus signals such as an address signal, a data signal, and a control signal output from the functional blocks A to F are temporarily collected by the bus signal distribution block 7 and then distributed to the desired functional blocks A to F through common buses such as an address bus 10, a data bus 11, and a control bus 12. Distribution of bus signals is controlled by the bus control circuit 8.

Details of the arrangement of the bus signal distribution block 7 will be described.

The bus signal distribution block 7 has a plurality of distribution blocks in correspondence with the types of connected buses. In this case, the bus signal distribution block 7 has an address signal distribution block 71, a data signal distribution block 72, a control signal distribution block 73, an address valid signal distribution block 74, a read/write signal distribution block 75, and an address ready signal distribution block 76.

The input sides of these distribution blocks 71 to 76 are connected to the plurality of buses from the functional blocks A to F, and the output sides are A connected to the common buses such as the address bus 10, data bus 11, and control bus 12. Although not illustrated, bus connection to the address valid signal distribution block 74 and read/write signal distribution block 75 has the same arrangement as that of bus connection to the address signal distribution block 71, and bus connection to the address ready signal distribution block 76 has the same arrangement as that of bus connection to the control signal distribution block 73.

Signals output from the distribution blocks 71 to 76 are transmitted to the desired functional blocks A to F through the common buses.

Signal transmission/reception by the functional blocks A to F is performed in the following way.

Address signals output from the functional blocks A, B, C, and D are input to the address signal distribution block 71. After this, one of the signals is selected under the control of the bus control circuit 8. The selected address signal is input to one of the functional blocks A to F, which corresponds to the address. At this time, the address signal distribution block 71 drives the entire address bus 10 commonly connected to the functional blocks B to F to input the signal to a desired functional block, as shown in FIG. 13.

Data signals output from the functional blocks A to F are input to the data signal distribution block 72, and then, one of the signals is selected under the control of the bus control circuit 8. The selected data signal is input to one of the functional blocks A to F, which is designated by an address signal in advance. At this time, the data signal distribution block 72 drives the entire data bus 11 commonly connected to the functional blocks A to F to input the signal to a desired functional block, as shown in FIG. 14.

Control signals from the functional blocks B to F are input to the control signal distribution block 73. After this, one of the signals is selected under the control of the bus control circuit 8. The selected control signal is input to one of the functional blocks A to F, which is designated by an address signal in advance. At this time, the control signal distribution block 73 drives the entire control bus 12 commonly connected to the functional blocks A to D to input the signal to a desired functional block, as shown in FIG. 15.

That is, the types of signals input/output to/from the functional blocks A to F are determined in accordance with the functions of the functional blocks A to F. For example, since the functional block A comprises a CPU, an address signal is output, and a data signal is input or output, although no address signal is input.

Since the functional blocks B, C, and D comprise peripheral functional units such as a debug unit and an MPEG decoder, both address signals and data signals are input or output.

The functional blocks E, and F comprises interfaces of memory devices such as a DRAM and a ROM, address signals are input but not output. A data signal is input/output to/from the functional block E to read/write data. However, the functional block F is used to merely read out a data signal, so the data signal is only output.

However, in the above-described prior art, the entire common bus must be driven only to input a signal to one functional block, resulting in an increase in power consumption.

The conventional arrangement still has an advantage that the circuit arrangement is simple because all functional blocks are connected to one common bus. However, along with today's development in micropatterning, wiring can be more easily led, and a demand has arisen more for reduction of power consumption during operation than for a simple circuit arrangement.

SUMMARY OF THE INVENTION

It is an object of the present invention to provide a signal distribution system and method based on a bus arrangement for reducing power consumption.

In order to achieve the above object, according to the present invention, there is provided a signal distribution system comprising a plurality of functional blocks divided into a plurality of groups each of which receives bus signals of the same type, at least one bus signal distribution block for distributing a bus signal received from a transmission source functional block to a transmission destination functional block, at least one bus connected between the bus signal distribution block and the functional blocks, the bus having division buses arranged in units of groups of the functional blocks, and bus control means for controlling the bus signal distribution block to select one of the division buses connected to a transmission destination group on the basis of an address signal received from the transmission source functional block and transmit the received bus signal to the transmission destination functional block in the transmission destination group through the selected division bus.

BRIEF DESCRIPTION OF THE DRAWINGS

FIG. 1 is a block diagram showing a signal distribution system according to the first embodiment of the present invention;

FIG. 9 is a view showing the arrangement of an address/data signal distribution block shown in FIG. 8;

FIGS. 10A to 10M are timing charts showing the write operation of the signal distribution system shown in FIG. 8;

FIGS. 11A to 11O are timing charts showing the read operation of the signal distribution system shown in FIG. 8;

DESCRIPTION OF THE PREFERRED EMBODIMENTS

Figure 2:
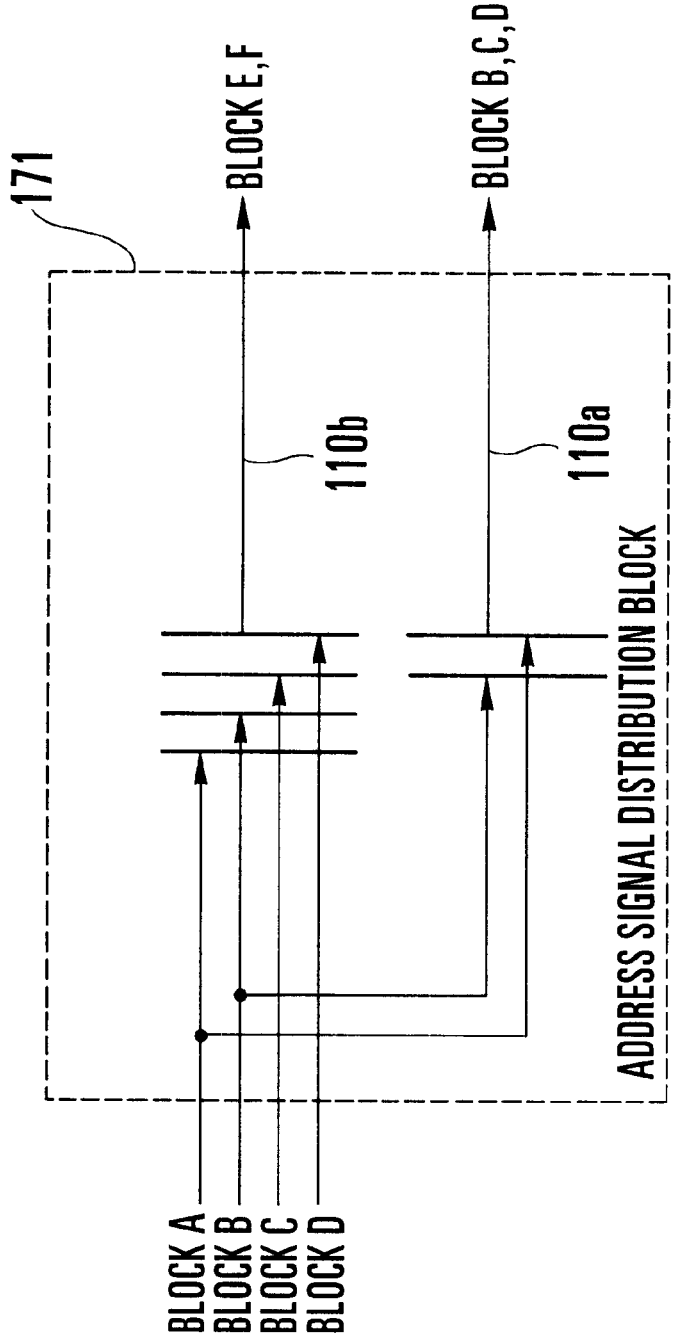
FIG. 2 is a view showing the arrangement of an address signal distribution block shown in FIG. 1.

The present invention will be described below in detail with reference to the accompanying drawings.

FIG. 1 shows a signal distribution system according to the first embodiment of the present invention. As shown in FIG. 1, functional blocks A to F are arranged on a chip. The block A constructs a CPU 101, the block B constructs a debug unit 102, the block C constructs an MPEG decoder 103, the block D constructs another functional unit 104 such as a graphic engine, the block E constructs a DRAM interface 105, and the block F constructs a ROM interface 106. In addition to the blocks A to F, a bus signal distribution block 107 and a bus control circuit 108 are integrated.

Address signals are input from the functional blocks A to D to an address signal distribution block 171. Assume that the functional blocks E and F may use addresses from all of the functional blocks A to D, and the functional blocks B to D may use only addresses from the functional blocks A and B. However, the present invention is not limited to the above arrangement, and any other arrangement can be used, as a matter of course.

The arrangement of the bus signal distribution block 107 will be described in detail.

The bus signal distribution block 107 comprises a plurality of distribution blocks in accordance with the types of connected buses, i.e., the address signal distribution block 171, a data signal distribution block 172, a control signal distribution block 173, an address valid signal distribution block 174, a read/write signal distribution block 175, and an address ready signal distribution block 176.

The input sides of these distribution blocks are connected to a plurality of buses from the functional blocks A to F, and the output sides are connected to an address bus 110, a data bus 111, and a control bus 112 in units of groups comprising the functional blocks A to F. Signals output from the distribution blocks 171, 172, and 173 are transmitted to desired functional blocks A to F through these buses 110 to 112.

Although not illustrated in FIG. 1, the address valid signal distribution block 174 and read/write signal distribution block 175 are connected to a bus similar to that connected the address signal distribution block 171. The address ready signal distribution block 176 is connected to a bus similar to that connected the control signal distribution block 173.

The arrangement of the address signal distribution block 171 will be described next.

To transmit an address signal, the functional blocks B to D are put into a first group while the functional blocks E and F are put into a second group, and a common bus is connected to each group. In this case, the address signal distribution block 171 has an arrangement shown in FIG. 2.

Referring to FIG. 2, the address signal distribution block 171 is constituted by a multiplexer. Address signals output from the blocks A to D are input to the multiplexer. One of the four signals is selected and transmitted by driving the bus connected to the transmission destination.

The data signal distribution block 172, control signal distribution block 173, address valid signal distribution block 174, read/write signal distribution block 175, and address ready signal distribution block 176 are also constituted by multiplexers for switching connection in accordance with a correspondence between the transmission source and transmission destination.

A specific example of drive control for the bus will be described next.

Figure 3:
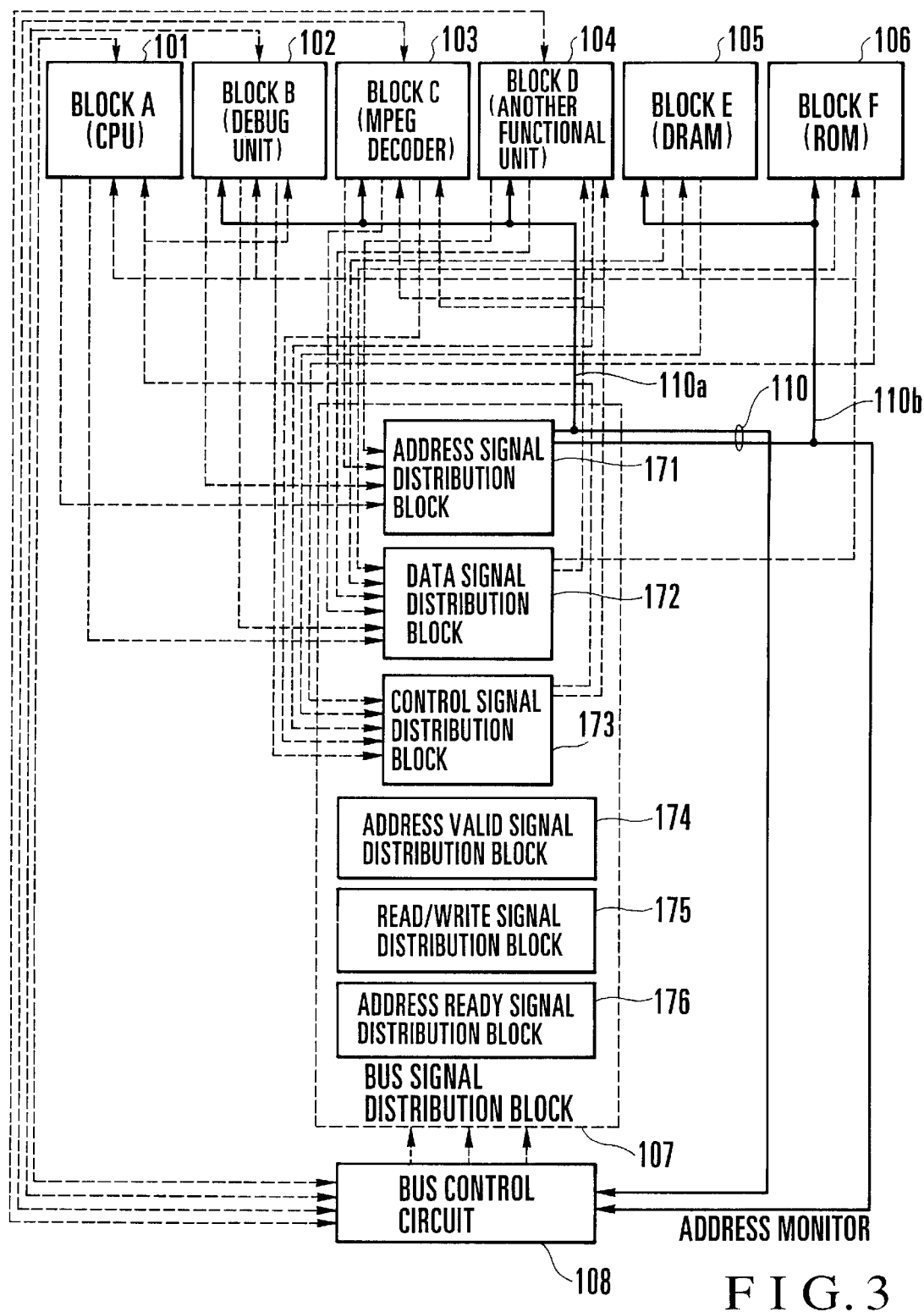
FIG. 3 is a block diagram showing the connection arrangement of an address bus in the signal distribution system shown in FIG. 1.

FIG. 3 shows the connection arrangement of the address bus in the signal distribution system shown in FIG. 1. As shown in FIG. 3, the address bus 110 has a division bus 110*a* to the functional blocks B to D and a division bus 110*b* to the functional blocks E and F.

When one of address signals from the functional blocks A and B is selected, the address signal distribution block 171 drives both of the division buses 110*a* and 110*b* in accordance with the address value to transmit the input address signal. When one of address signals from the functional blocks C and D is selected, the address signal distribution block 171 drives only the division bus 110*b* to transmit the input address signal to a corresponding functional block. Since the division bus 110*a* is not used, power consumption is suppressed by fixing the output value at "0" or "1".

Figure 4:
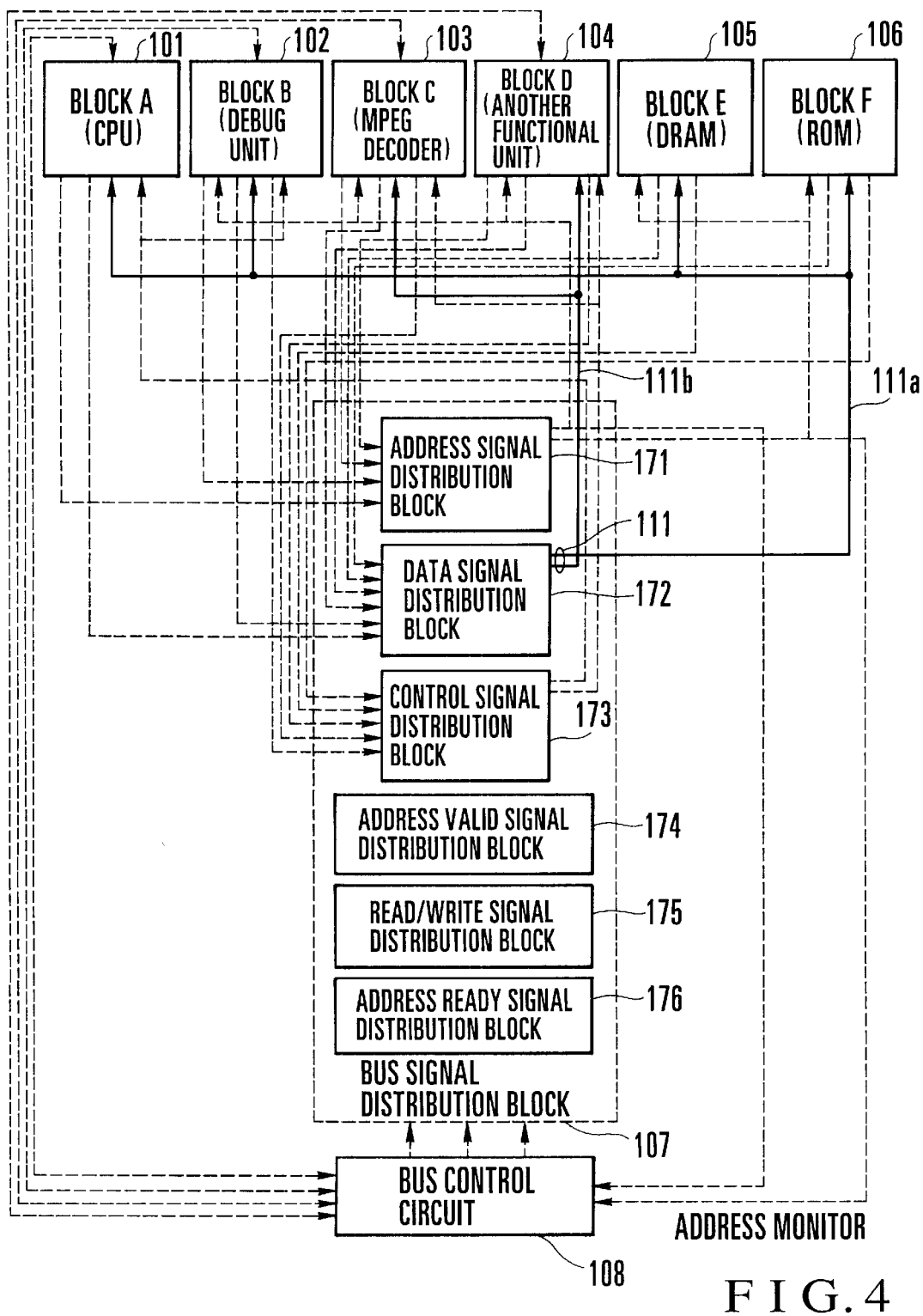
FIG. 4 is a block diagram showing the connection arrangement of a data bus in the signal distribution system shown in FIG. 1.

FIG. 4 shows the connection arrangement of the data bus in the signal distribution system shown in FIG. 1. As shown in FIG. 4, the data bus 111 comprises a division bus 111*a* to the functional blocks A, B, E, and F, and a division bus 111*b* to the functional blocks C and D.

When one of data signals from the functional blocks A to F is selected, the data signal distribution block 172 drives the division bus 111*a* or 111*b* in accordance with the value of an address that is selected in advance, thereby transmitting the input data signal to a corresponding functional block. The output value from an unused block is fixed at "0" or "1" to suppress power consumption.

Figure 5:
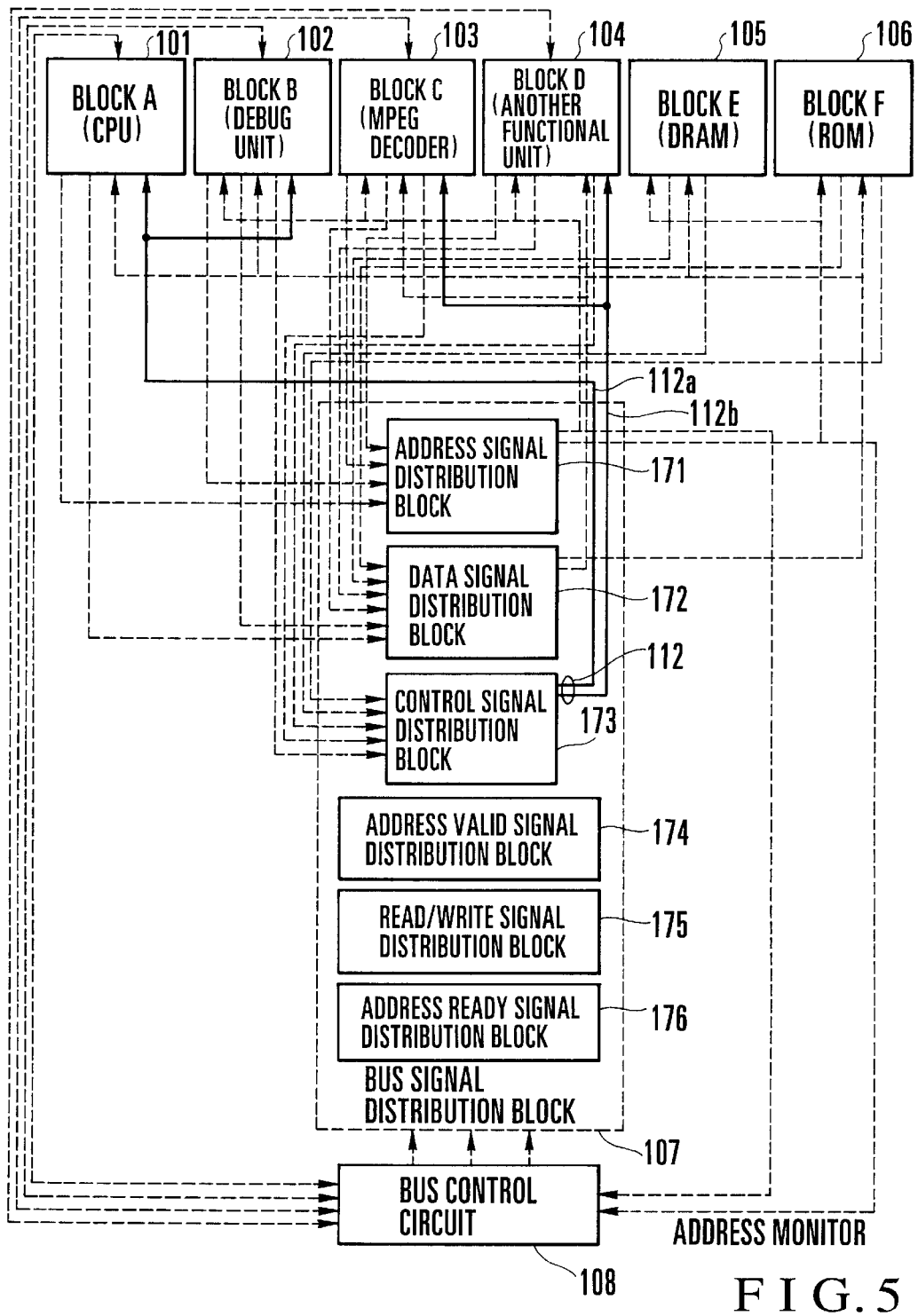
FIG. 5 is a block diagram showing the connection arrangement of a control bus in the signal distribution system shown in FIG. 1.

FIG. 5 shows the connection arrangement of the control bus in the signal distribution system shown in FIG. 1. As shown in FIG. 5, the control bus 112 comprises a division bus 112*a* to the functional blocks A and B and a division bus 112*b* to the functional blocks C and D.

When one of control signals from the functional blocks B to F is selected, the control signal distribution block 173 drives the division bus 112*a* or 112*b* in accordance with the value of an address that is selected in advance, thereby transmitting the input control signal to a corresponding functional block. The output from an unused bus is fixed at "0" or "1" to suppress power consumption.

The write operation of the signal distribution system shown in FIG. 1 will be described next with reference to FIGS. 6A to 6O. A data write in the functional block D (functional unit 104) by the functional block A (CPU 101) will be described. The blocks A to F on the chip operate in synchronism with a clock (FIG. 6A).

Figure 6:
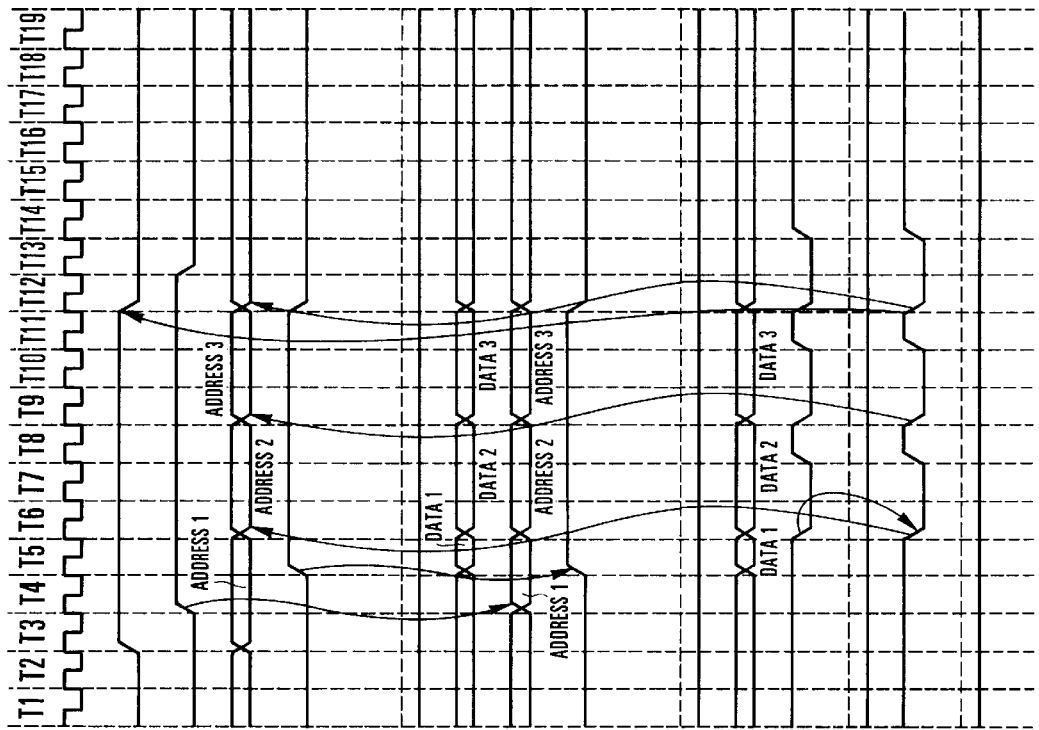
FIGS. 6A to 6O are timing charts showing the write operation of the signal distribution system shown in FIG. 1.

The functional block A outputs address signal 1 set in the functional block D to the address signal distribution block 171 (FIG. 6D). Simultaneously, the functional block A outputs a bus use request signal to the bus control circuit 108 (FIG. 6B).

When the bus corresponding to address signal 1, i.e., the division bus 110*a* is usable, the bus control circuit 108 outputs a bus use permission signal to the functional block A (FIG. 6C). The bus control circuit 108 also switches connection of the multiplexer in the address signal distribution block 171 to connect the address bus from the functional block A to the division bus 110*a*.

The bus control circuit 108 always monitors the address signal output from the address signal distribution block 171. Upon detecting address signal 1, the bus control circuit 108 switches connection of the multiplexer in the data signal distribution block 172 to allow use of the division bus 111*b* corresponding to address signal 1, thereby connecting the data bus from the functional block A to the division bus 111*b*.

In the same way as described above, the bus control circuit 108 also switches connection of the multiplexers in the control signal distribution block 173, address valid signal distribution block 174, read/write signal distribution block 175, and address ready signal distribution block 176.

The multiplexer in each of the address valid signal distribution block 174 and read/write signal distribution block 175 has the same arrangement as that in the address signal distribution block 171. The multiplexer in the address ready signal distribution block 176 has the same arrangement as that in the control signal distribution block 173.

Upon receiving the bus use permission signal (FIG. 6C), the functional block A outputs an address valid signal to the address valid signal distribution block 174 (FIG. 6E). The address valid signal distribution block 174 outputs the received address valid signal to the functional block D designated by address signal 1 (FIG. 6I). Since a read/write signal (FIGS. 6F and 6J) supplied from the functional block A to the functional block D through the read/write signal distribution block 175 always has a value "0", write operation is executed.

When address signal 1 (FIG. 6H) to the functional block D is confirmed by the address valid signal, data signal 1 output from the functional block A is received by the functional block D through the data signal distribution block 172 and division bus 111*b* (FIGS. 6G and 6K) and written in a register in the functional block D.

After this, address signals 2 and 3 (FIGS. 6D and 6H) are sequentially confirmed in synchronism with the trailing edge of an address ready signal (FIGS. 6L and 6N) from the functional block A, respectively. With this operation, data signals 2 and 3 (FIGS. 6G and 6K) are received by the functional block D and written in the register in the functional block D. When the bus use request signal (FIG. 6B) changes to "0", the bus use permission signal (FIG. 6C) also changes to "0", thereby completing the write operation.

FIGS. 6M and 6O show a data ready signal output from the functional block A to the functional block D through the control signal distribution block 173. In the data write, the data ready signal is not used.

An operation of reading data signals from the functional blocks A to F will be described next with reference to FIGS. 7A to 7P. In this case, a data read from the functional block D (functional unit 104) by the functional block A (CPU 101) will be described. The functional blocks A to F on the chip operate in synchronism with a clock (FIG. 7A).

Figure 7:
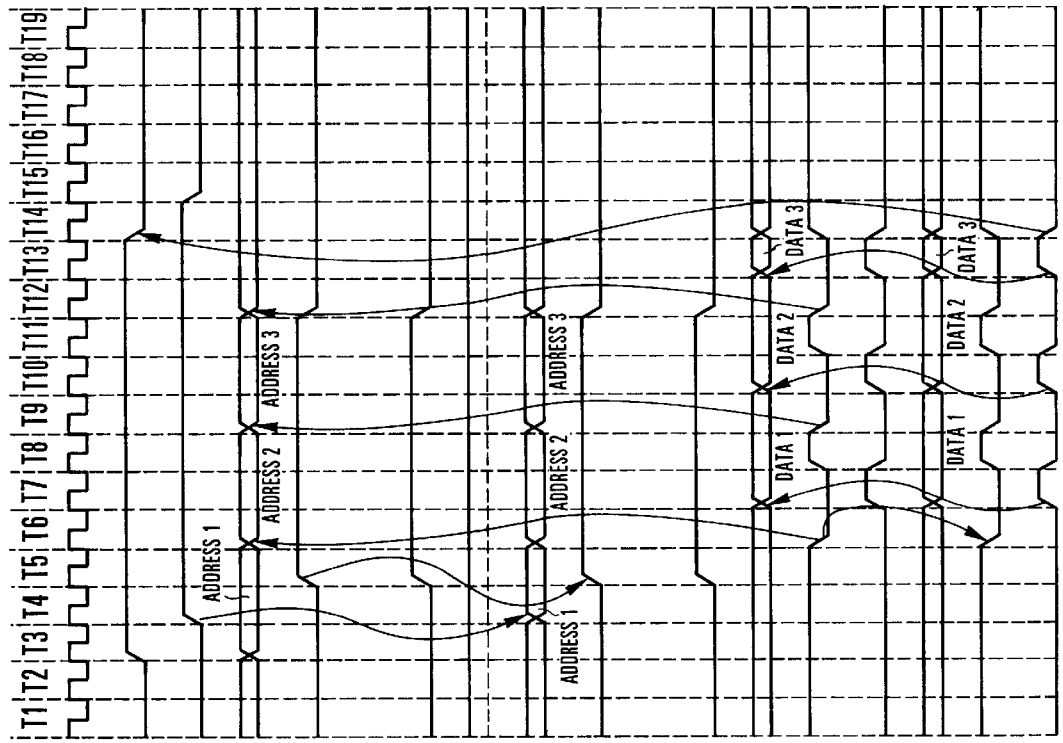
FIGS. 7A to 7P are timing charts showing the read operation of the signal distribution system shown in FIG. 1.

The functional block A outputs address signal 1 to the address signal distribution block 171 (FIG. 7D). Simultaneously, the functional block A outputs a bus use request signal to the bus control circuit 108 (FIG. 7B).

Address signal 1 represents an address set in the functional block D.

When the division bus 110*a* corresponding to address signal 1 is usable, the bus control circuit 108 outputs a bus use permission signal to the functional block A (FIG. 7C). The bus control circuit 108 also switches connection of the multiplexer in the address signal distribution block 171 to connect the address bus from the functional block A to the division bus 110*a*.

The bus control circuit 108 always monitors the address signal output from the address signal distribution block 171. Upon detecting address signal 1, the bus control circuit 108 switches connection of the multiplexer in the data signal distribution block 172 to allow use of the division bus 111*b* corresponding to address signal 1, thereby connecting the data bus from the functional block A to the division bus 111*b*.

In the same way as described above, the bus control circuit 108 also switches connection of the multiplexers in the control signal distribution block 173, address valid signal distribution block 174, read/write signal distribution block 175, and address ready signal distribution block 176.

Upon receiving the bus use permission signal (FIG. 7C), the functional block A outputs an address valid signal to the address valid signal distribution block 174 (FIG. 7E). The address valid signal distribution block 174 outputs the received address valid signal to the functional block D designated by address signal 1 (FIG. 7I). When a read/write signal (FIGS. 7F and 7J) supplied from the functional block A to the functional block D through the read/write signal distribution block 175 changes to "1", read operation is executed.

When address signal 1 (FIG. 7H) to the functional block D is confirmed by the address valid signal, data signal 1 is read out from the functional block D to the functional block A in synchronism with the leading edge of a data ready signal (FIGS. 7M and 7P) output from the functional block D through the control signal distribution block 173 (FIGS. 7K and 7N).

After this, address signals 2 and 3 (FIGS. 7D and 7H) are sequentially confirmed in synchronism with the trailing edge of an address ready signal (FIGS. 7L and 7O) from the functional block A, respectively. With this operation, data signals 2 and 3 (FIGS. 7K and 7N) are read out from the functional block D in synchronism with the leading edge of the data ready signal (FIGS. 7M and 7P). When the bus use request signal (FIG. 7B) changes to "0", the bus use permission signal (FIG. 7C) also changes to "0", thereby completing the read operation.

The second embodiment of the present invention will be described next.

In the first embodiment shown in FIG. 1, address signals and data signals are distributed using the dedicated address signal distribution block 171 and data signal distribution block 172, respectively. When these signals are time-divisionally distributed, address signals and data signals can be distributed by one distribution block. In addition, a common bus can be used as the address bus and data bus.

Figure 8:
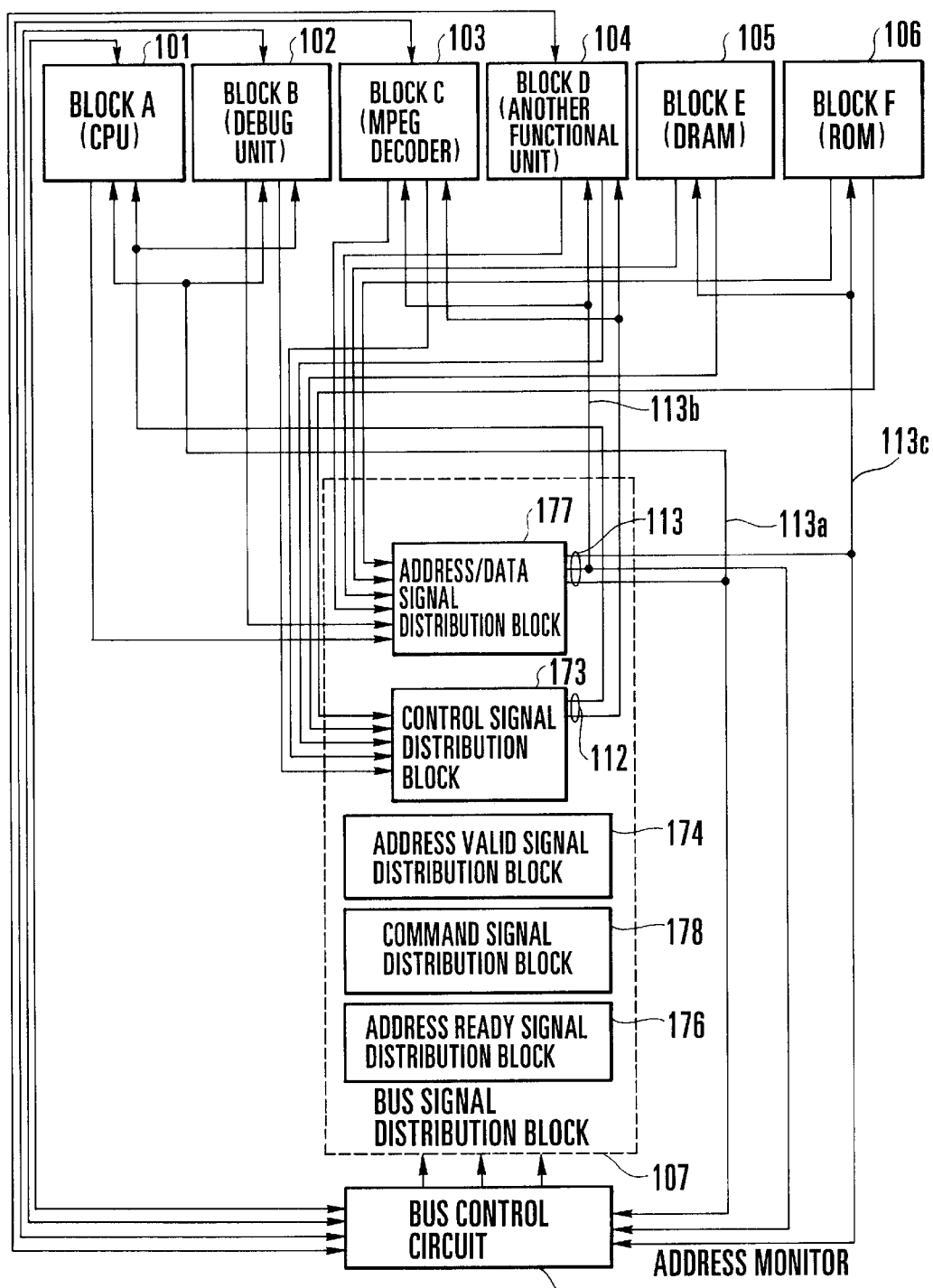
FIG. 8 is a block diagram showing a signal distribution system according to the second embodiment of the present invention.
Figure 12:
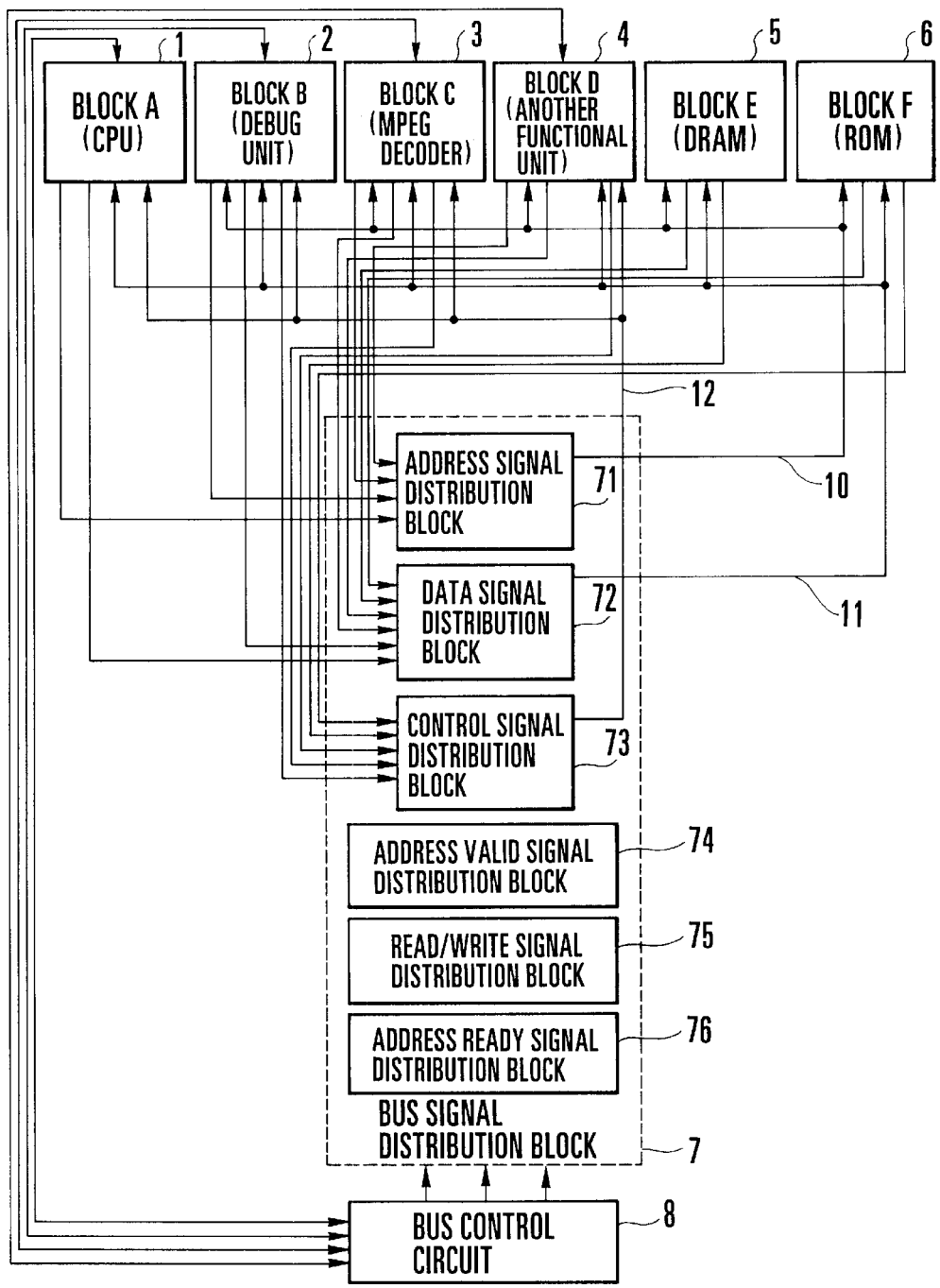
FIG. 12 is a block diagram showing a conventional signal distribution system.
Figure 13:
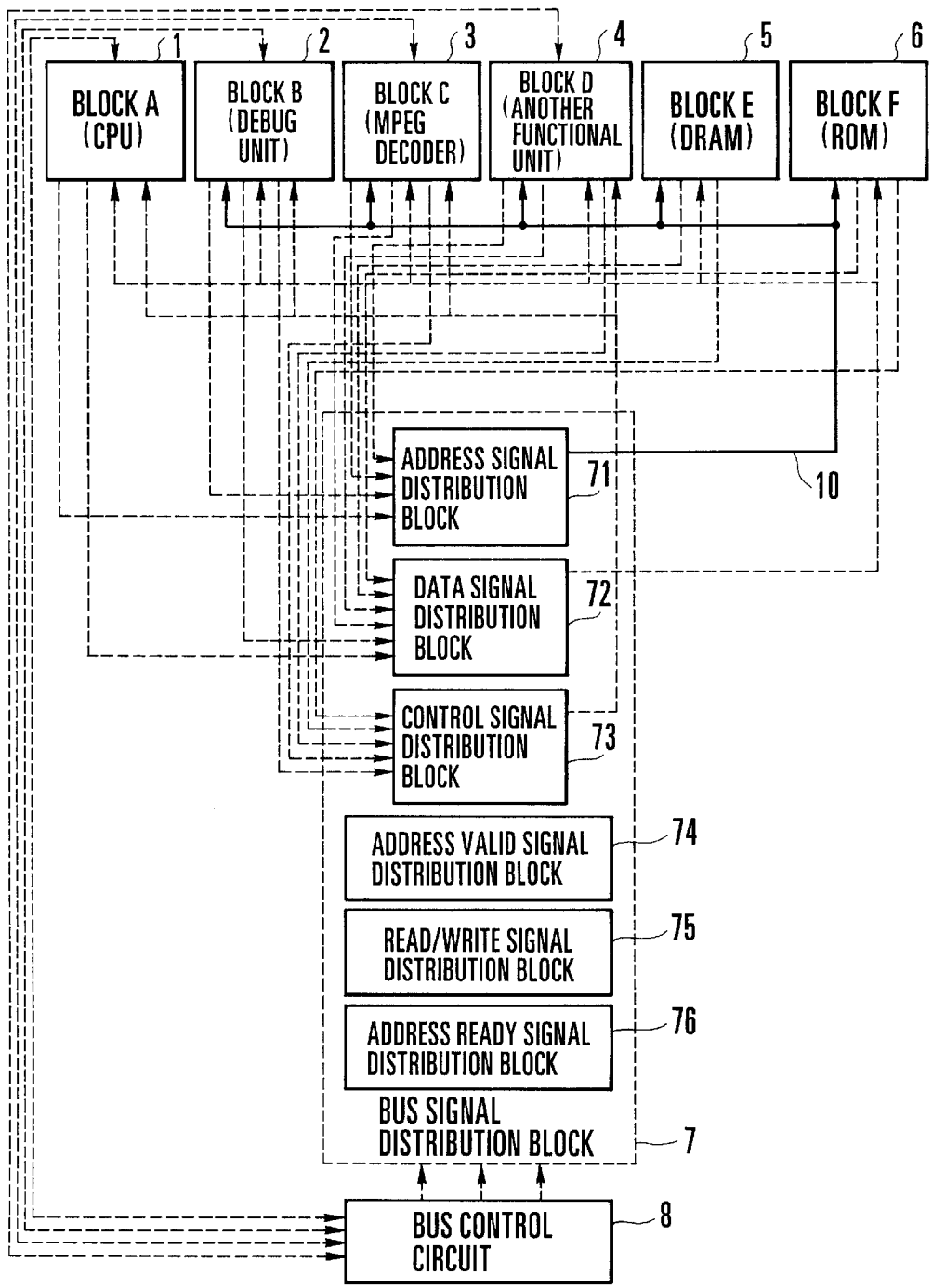
FIG. 13 is a view showing the connection arrangement of an address bus in the signal distribution system shown in FIG. 12.
Figure 14:
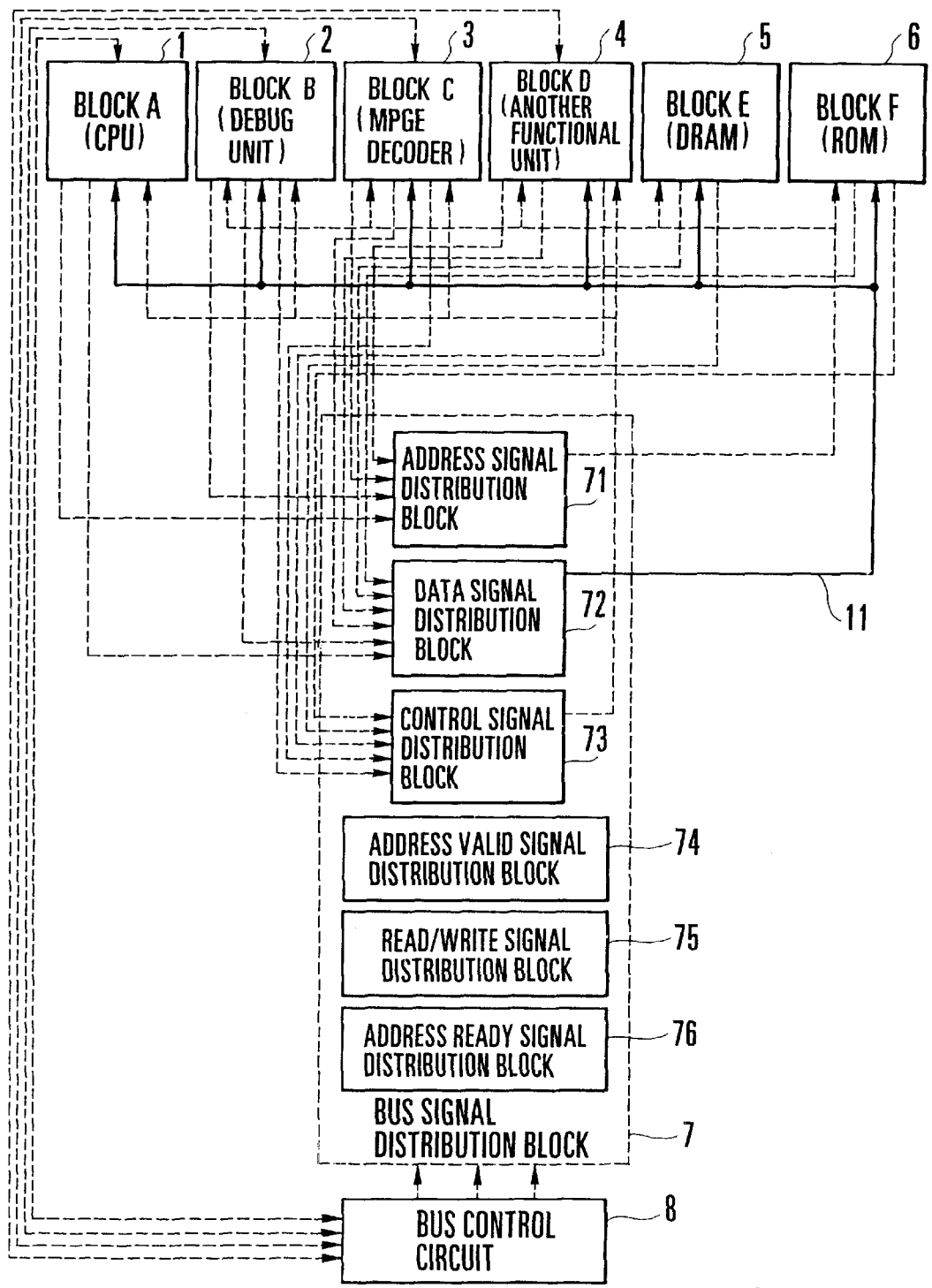
FIG. 14 is a view showing the connection arrangement of a data bus in the signal distribution system shown in FIG. 12.
Figure 15:
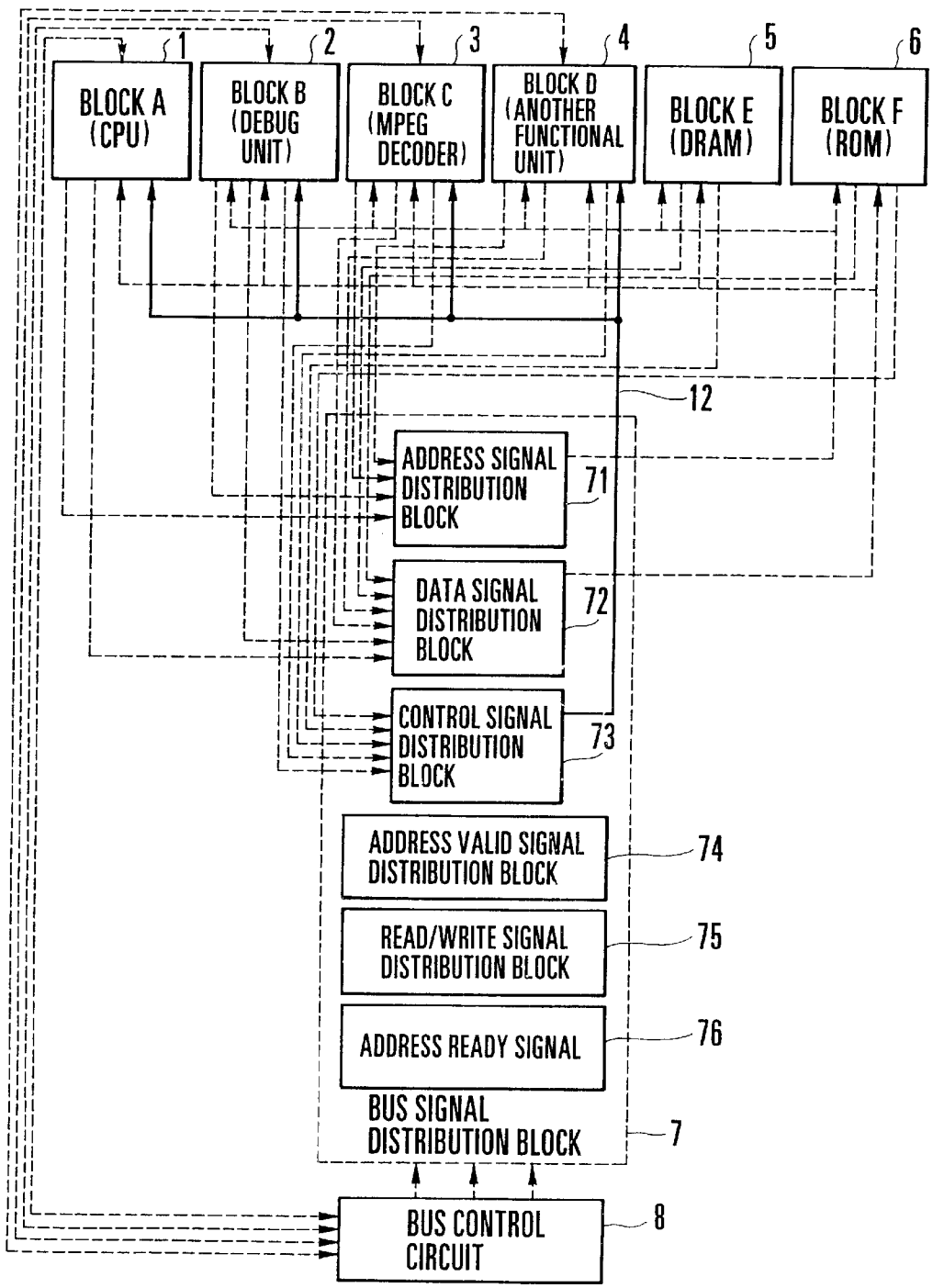
FIG. 15 is a view showing the connection arrangement of a control bus in the signal distribution system shown in FIG. 12.

FIG. 8 shows a signal distribution system according to the second embodiment of the present invention. The same reference numerals as in FIG. 1 denote the same parts in FIG. 8. In this embodiment, the address signal distribution block 171 and data signal distribution block 172 shown in FIG. 1 are replaced with one address/data signal distribution block 177 so as to time-divisionally distribute address signals and data signals. A command signal distribution block 178 is connected to a bus similar to that connected to the address signal distribution block 171 (FIG. 1).

As shown in FIG. 9, the address/data signal distribution block 177 comprises a multiplexer for distributing address signals and data signals input from functional blocks A to F to desired functional blocks. An address/data bus 113 comprises a bus 113a to the functional blocks A and B, a bus 113b to the functional blocks C and D, and a bus 113c to the functional blocks E and F.

The address/data signal distribution block 177 time-divisionally receives address signals or data signals output from the functional blocks A to F. After one of the signals is selected, the address/data signal distribution block 177 drives the buses 113a to 113c connected to the transmission destination to transmit the signal.

For example, when a bus signal from the functional block A or B is selected, all the buses 113a to 113c are driven to transmit the input bus signal. When a bus signal from the functional block C or D is selected, the buses 113b and 113c are driven to transmit the input bus signal. When a bus signal from the functional block E or F is selected, the buses 113a and 113b are driven to transmit the input bus signal. The output value from an unused bus is fixed at "0" or "1" to suppress power consumption.

This also applies to the control signal distribution operation, as will be described below.

A control signal distribution block 173 selects one of control signals from the functional blocks B to F and drives a division bus 112a to the functional blocks A and B or a division bus 112b to the functional blocks C and D in accordance with the value of an address that is selected in advance, thereby transmitting the input control signal. The output value from an unused bus is fixed at "0" or "1" to suppress power consumption.

Write operation of the signal distribution system shown in FIG. 8 will be described below with reference to FIGS. 10A to 10M. A data write in the functional block D (functional unit 104) by the functional block A (CPU 101) will be described. The blocks A to F operate in synchronism with a clock (FIG. 10A).

First, the functional block A (CPU 101) outputs address signal 1 to the address/data signal distribution block 177 (FIG. 10D). Simultaneously, the functional block A outputs a bus use request signal to a bus control circuit 108 (FIG. 10B) and command signal 1 to the command signal distribution block 178 (FIG. 10F). This command signal corresponds to a read/write signal in FIG. 1. Address signal 1 represents an address set in the functional block D.

When the bus 113b corresponding to address signal 1 is usable, the bus control circuit 108 outputs a bus use permission signal to the functional block A (FIG. 10C). The bus control circuit 108 also switches connection of the multiplexer in the address/data signal distribution block 177 to connect the address/data bus from the block A to the bus 113b.

The bus control circuit 108 always monitors the address signal output from the address/data signal distribution block 177. Upon detecting address signal 1, the bus control circuit 108 switches connection of multiplexers in the data signal distribution block 172, an address valid signal distribution block 174, the command signal distribution block 178, and an address ready signal distribution block 176 to allow use of the bus corresponding to address signal 1.

The multiplexer in each of the address valid signal distribution block 174 and command signal distribution block 178 has the same arrangement as that in the address/data signal distribution block 177. The multiplexer in the address ready signal distribution block 176 has the same arrangement as that in the control signal distribution block 173.

Upon receiving the bus use permission signal (FIG. 10C), the functional block A outputs an address valid signal to the address valid signal distribution block 174 (FIG. 10E). The address valid signal distribution block 174 outputs the received address valid signal to the functional block D designated by address signal 1 (FIG. 10I). At this time, write operation is designated by command signal 1 (FIG. 10H) supplied from the command signal distribution block 178 to the functional unit 104.

When address signal 1 (FIG. 10G) to the functional block D is confirmed by the address valid signal, data signal 1 from the functional block A is received by the functional block D through the bus 113b and written in a register in the functional block D.

After this, data signal 2 is received by the functional block D in synchronism with the trailing edge of an address ready signal (FIGS. 10D and 10L) from the functional block A and written in the register in the functional block D. When the bus use request signal (FIG. 10B) changes to "0", the bus use permission signal (FIG. 10C) also charges to "0", thereby completing the write operation.

FIGS. 10K and 10M show a data ready signal supplied from the functional block D to the functional block A through the control signal distribution block 173.

An operation of reading out data from the functional block D (functional unit 104) by the functional block A (CPU 101) will be described next with reference to FIGS. 11A to 11O. The blocks A to F on the chip operate in synchronism with a clock (FIG. 11A).

First, the functional block A outputs address signal 1 to the address/data signal distribution block 177 (FIG. 11D). Simultaneously, the functional block A outputs a bus use request signal to the bus control circuit 108 (FIG. 11B) and command signal 1 to the command signal distribution block 178 (FIG. 11F). This command signal corresponds to a read/write signal in FIG. 1. Address signal 1 represents an address set in the functional block D.

When the bus 113b corresponding to address signal 1 is usable, the bus control circuit 108 outputs a bus use permission signal to the functional block A (FIG. 11C). The bus control circuit 108 also switches connection of the multiplexer in the address/data signal distribution block 177 to connect the address/data bus from the functional block A to the bus 113b.

The bus control circuit 108 always monitors the address signal output from the address/data signal distribution block 177. Upon detecting address signal 1, the bus control circuit 108 switches connection of the multiplexers in the control signal distribution block 173, address valid signal distribution block 174, command signal distribution block 178, and address ready signal distribution block 176 to allow use of the bus corresponding to address signal 1.

Upon receiving the bus use permission signal (FIG. 11C), the functional block A outputs an address valid signal to the address valid signal distribution block 174 (FIG. 11E). The address valid signal distribution block 174 outputs the received address valid signal to the functional block D designated by address signal 1 (FIG. 11I). At this time, read operation is designated by command signal 1 (FIG. 11H) supplied from the command signal distribution block 178 to the functional block D.

When address signal 1 (FIG. 11G) is confirmed by the address valid signal, data signal 1 is read out to the block A through the bus 113b and address/data signal distribution block 177 in synchronism with the leading edge of a data ready signal (FIGS. 11L and 11O) from the functional block D (FIGS. 11J and 11M).

After this, data signals 2 and 3 are read to the functional block A in synchronism with the leading edge of the data ready signal (FIGS. 11L and 11O) from the functional block D. When the bus use request signal (FIG. 11B) changes to "0", the bus use permission signal (FIG. 11C) also changes to "0", thereby completing the read operation.

FIGS. 11K and 11N show the address ready signal supplied from the functional block A to the functional block D through the address ready signal distribution block 176.

In the above embodiments, the buses set on a one-chip LSI have been described. However, the present invention is not limited to this. For example, the present invention can also be applied to a system on a printed board. In addition, the types of buses, the types of distribution blocks, the arrangement of buses branched from distribution blocks, and the like are not limited to those described above.

As has been described above, according to the present invention, functional blocks are put into groups in accordance with the types of bus signals to be input/output, and a bus is arranged in units of groups. Hence, unnecessary buses need not be driven, unlike the prior art. Since only minimum and necessary buses can be driven, storage/removal of excess charges can be prevented, and power consumption can be reduced.

In addition, when address signals and data signals are time-divisionally distributed, the number of distribution blocks or buses can be decreased.

What is claimed is:

1. A signal distribution system comprising:
   a plurality of functional units, each of which is intended to receive data from at least one but not all of the other functional units according to a predetermined data distribution pattern;
   a bus system comprised of a plurality of independent division buses, with the individual functional units being connected to the division buses according to the predetermined data distribution pattern and predetermined input/output signals directions of each one of said plurality of functional units;
   a bus signal distribution unit operable to connect output signals from the functional units to the division buses according to the predetermined data distribution pattern and predetermined input/output signals directions of each one of said plurality of functional units, whereby a signal received from a transmission source functional unit may be delivered to the intended destination functional unit through the division bus to which the destination functional unit is connected; and
   a bus control unit operative to control said bus signal distribution unit to select one of said division buses to receive data from the transmission source functional unit according to an address signal received from said transmission source functional unit, and to transmit the received bus signal to said transmission destination functional unit through the selected division bus.

2. A system according to claim 1, wherein said bus system comprises at least one of an address bus, a data bus, and a control bus.

3. A system according to claim 2, wherein said bus signal distribution unit comprises at least one of a first circuit for distributing an address signal, a second circuit for distributing a data signal, and a third circuit for distributing a control signal.

4. A system according to claim 1, wherein said bus signal distribution unit comprises a multiplexer.

5. A system according to claim 1, wherein said bus signal distribution unit time-divisionally distributes bus signals according to the predetermined data distribution pattern.

6. A system according to claim 5, wherein said bus signal distribution unit time-divisionally distributes an address signal and a bus signal.

7. A system according to clam 1, wherein said bus control unit monitors the address signal from said transmission source functional unit and controls connection of said bus signal distribution unit on the basis of the detected address signal.

8. A signal distribution method for a system comprising a bus system and a plurality of functional units, each of which is intended to receive data through the bus system from at least one but not all of the other functional units according to a predetermined data distribution pattern, the method comprising the steps of:
   connecting the functional units to receive data from other functional units through individual independent division buses within the bus system, the functional units being connected to the division buses according to the predetermined data distribution pattern and predetermined input/output signals directions of each one of said plurality of functional units;

connecting output signals from the functional units to a bus signal distribution unit for delivery to the division buses according to the predetermined data distribution pattern and predetermined input/output signals directions of each one of said plurality of functional units, whereby a signal received from a transmission source functional unit may be delivered to the intended destination functional unit through the division bus to which said intended destination functional unit is connected;

selecting one of said division buses to receive data from a transmission source functional unit according to an address signal received from said transmission source functional unit; and transmitting the received bus signal to said transmission destination functional unit through the selected division bus.

9. A method according to claim 8, wherein said bus comprises at least one of an address bus, a data bus, and a control bus.

10. A method according to claim 8, wherein said bus signal distribution unit comprises at least one of a first circuit for distributing an address signal, a second circuit for distributing a data signal, and a third circuit for distributing a control signal.

11. A method according to claim 8, wherein said bus signal distribution block time-divisionally distributes bus signals according to the pattern predetermined data distribution.

12. A method according to claim 8, wherein the selection step comprises the steps of monitoring an address signal from said transmission source functional unit, and controlling connection of said bus signal distribution unit on the basis of the detected address signal.

* * * * *

UNITED STATES PATENT AND TRADEMARK OFFICE
CERTIFICATE OF CORRECTION

PATENT NO.  : 6,434,646 B1
DATED       : August 13, 2002
INVENTOR(S) : Yukinori Sugiyama It is certified that error appears in the above-identified patent and that said Letters Patent is hereby corrected as shown below:

<u>Title page,</u>
Item [30], should read:
-- [30] Foreign Application Priority Data
April 7, 1998           (JP) 10-094960 --

Signed and Sealed this

Twentieth Day of May, 2003

JAMES E. ROGAN
*Director of the United States Patent and Trademark Office*